US011382456B2

United States Patent
Corso et al.

(10) Patent No.: US 11,382,456 B2
(45) Date of Patent: Jul. 12, 2022

(54) MULTI-PIECE CONSTRUCTION OF BARREL SMOKER

(71) Applicant: W.C. BRADLEY CO., Columbus, GA (US)

(72) Inventors: Dan Corso, Columbus, GA (US); Brad Gillespie, Midland, GA (US); Anthony Hamilton, Hamilton, GA (US); Brian Barnett, Fortson, GA (US)

(73) Assignee: W.C. Bradley Co., Columbus, GA (US)

( * ) Notice: Subject to any disclaimer, the term of this patent is extended or adjusted under 35 U.S.C. 154(b) by 119 days.

(21) Appl. No.: 16/507,950

(22) Filed: Jul. 10, 2019

(65) Prior Publication Data

US 2020/0015626 A1    Jan. 16, 2020

Related U.S. Application Data

(60) Provisional application No. 62/696,173, filed on Jul. 10, 2018.

(51) Int. Cl.
*A47J 37/07* (2006.01)

(52) U.S. Cl.
CPC ....... *A47J 37/0704* (2013.01); *A47J 37/0763* (2013.01)

(58) Field of Classification Search
CPC . A47J 37/0763; A47J 37/0704; A47J 37/0731
See application file for complete search history.

(56) References Cited

U.S. PATENT DOCUMENTS

| 3,049,071 A | * | 8/1962 | Diack | A47J 37/0704 |
| | | | | 99/340 |
| 3,330,266 A | * | 7/1967 | Stephen | A47J 37/0704 |
| | | | | 126/25 R |
| 4,094,295 A | | 6/1978 | Boswell et al. | |
| 4,495,860 A | | 1/1985 | Hitch et al. | |
| 5,348,297 A | * | 9/1994 | Parsons | C21D 9/0068 |
| | | | | 463/47.7 |
| 6,016,797 A | | 1/2000 | Nowicke, Jr. | |

(Continued)

FOREIGN PATENT DOCUMENTS

| CN | 2010466739 | * | 5/2020 |
| GB | 2040439 A | | 8/1980 |
| PA | 200101276 | | 3/2003 |

OTHER PUBLICATIONS

"Bronco Drum Smoker—Product Walkthrough—Oklahoma Joe's", Apr. 30, 2019, Publisher: (Oklahoma Joe's Smokers) [online] retrieved from—URL:https://www.youtube.com/watch?v=0raNDMLvib8—entire document.

(Continued)

*Primary Examiner* — Alfred Basichas
(74) *Attorney, Agent, or Firm* — David G. Woodral; GableGotwals

(57) ABSTRACT

A smoker is formed from at least one generally cylindrical segment of a first diameter and at least one generally cylindrical segment of a second diameter. The first diameter is greater than the second diameter and a ledge is formed between the at least one generally cylindrical segment of a first diameter and the at least one generally cylindrical segment of a second diameter when the two are joined one atop the other.

19 Claims, 5 Drawing Sheets

(56) References Cited

U.S. PATENT DOCUMENTS

| | | | |
|---|---|---|---|
| 6,543,435 B1 * | 4/2003 | Regen | A47J 37/0704 |
| | | | 126/25 R |
| 8,915,238 B2 | 12/2014 | Goeken | |
| 8,919,334 B2 | 12/2014 | Glanville et al. | |
| D760,531 S | 7/2016 | Scheer | |
| 2004/0123857 A1 | 7/2004 | Viraldo | |
| 2005/0121018 A1 | 6/2005 | Rosen | |
| 2012/0107476 A1 | 5/2012 | McLemore et al. | |
| 2013/0014743 A1 | 1/2013 | Glanville et al. | |
| 2014/0165993 A1 | 6/2014 | Ahmed | |
| 2014/0345594 A1 | 11/2014 | Rhodes et al. | |
| 2016/0007622 A1 | 1/2016 | Bowyer | |
| 2017/0198917 A1 | 7/2017 | Gillespie et al. | |

OTHER PUBLICATIONS

International Search Report and Written Opinion issued by the ISA/US Oct. 28, 2019; Applicant: W.C. Bradley Co.

* cited by examiner

MULTI-PIECE CONSTRUCTION OF BARREL SMOKER

CROSS-REFERENCE TO RELATED CASES

This application claims the benefit of U.S. provisional patent application Ser. No. 62/696,173, filed on Jul. 10, 2018, and incorporates such provisional application by reference into this disclosure as if fully set out at this point.

FIELD OF THE INVENTION

This disclosure relates to outdoor cookers in general, and more specifically, to devices for cooking with smoke.

BACKGROUND OF THE INVENTION

In recent years, a number of products have been introduced to the market for cooking food in a smoking mode typified by cooking food at an air temperature of around 275° F. in a cylindrical vertical drum or barrel using some combination of fuels and smoking materials. The fuels and smoking materials may be arranged in an open-bottomed container at the bottom of the barrel with appropriate controllable air openings. Food is in the upper part of the barrel. In some cases, a diffuser plate is situated between the fuel and smoking material and the food being cooked. The barrel will be made of one piece or several pieces of the same diameter. Devices of this type are described in U.S. Pat. No. 8,919,334 to Glanville et al. and U.S. Pat. No. D760,531 to Scheer.

In reviewing the construction and use of several of these products it can be seen that the constant diameter barrel and/or open bottom imposes several problems. With a constant diameter cylindrical barrel, attachments for food support elements, diffuser elements, and fuel containing elements require multiple brackets attached to the inside of the barrel. These can be expensive and time consuming to manufacture and place properly. They may also impede access to, and placement of, various elements arranged in the barrel. It is also the case that the constant diameter barrel, either of one or multiple sections, will consume a great deal of space in a package or shipping container making it less convenient and more expensive to everyone in the chain of commerce.

An open-bottomed fuel and smoking material container has a limitation that an uneven fire can be produced from free introduction of combustion air though the bottom due to flue effects occurring in the pile of fuel being consumed. This is discussed in US Patent Application Publication No. 2014/0165993 by Ahmed. In addition, an open-bottomed container will not contain the ash produced from the fuel and smoking products, which must then be removed adding inconvenience and/or complexity of further elements inside the barrel.

What is needed is a system and method for addressing the above and related concerns.

SUMMARY OF THE INVENTION

The invention of the present disclosure, in one aspect thereof, comprises a smoker formed from at least one generally cylindrical segment of a first diameter, at least one generally cylindrical segment of a second diameter. The first diameter is greater than the second diameter and a ledge is formed between the at least one generally cylindrical segment of a first diameter and the at least one generally cylindrical segment of a second diameter when the two are joined one atop the other.

The smoker may have at least one interior component suspended from the ledge. It may also have an air inlet into the at least one generally cylindrical segment of a second diameter on a lower portion thereof. The air inlet may be fed by a snorkel extending upwardly at least to a level of the at least one generally cylindrical segment of a first diameter.

The smoker may include an ash and fuel assembly within the at least one generally cylindrical segment of a second diameter. An ash pan with circumferentially located air ports may be suspended above a floor of the at least one generally cylindrical segment of a second diameter so as to form a void between the ash pan and the floor. A diffuser plate may be suspended from the ledge by brackets that do not fasten to the ledge.

The smoker may comprise a wheeled cart affixed to one of the at least one generally cylindrical segment of a first diameter and at least one generally cylindrical segment of a second diameter.

The at least one generally cylindrical segment of a first diameter may provide a hinged lid with an exhaust. The smoker may further comprising at least one valve-controlled input feeding into the at least one generally cylindrical segment of a second diameter and/or at least one valve-controlled exhaust feeding from the at least one generally cylindrical segment of a first diameter.

The invention of the present disclosure, in another aspect thereof, comprises a smoker having an upper smoker body with an inner wall and an inward projection proximate a bottom thereof. A lower smoker body has an outer wall with an outward projection proximate a top thereof. The lower smoke body telescopically projects from the upper smoker body such that the inward projection and outward projections join to form a ledge inside the smoker.

In some embodiments, the smoker further comprises a plurality of fasteners that selectively rigidly attach the inward projection in a fixed relationship to the outward projection. A diffuser may be suspended from the ledge by a plurality of brackets.

The smoker may provide an ash pan having circumferentially located air ports suspended above a floor of the lower smoker body. An air inlet into the floor of the lower smoker body may be provided. The air inlet may be fed by a snorkel extending upwardly at least to a level of the upper smoker body. The snorkel may have an air valve distal from the air inlet.

A fuel grate may be provided above the ash pan. In some embodiments, a circumferential wall is in contact with the floor suspending the ash pan above the air inlet and suspending the fuel grate above the ash pan such that air entering the inlet can only reach the fuel grate via the air ports in the ash pan.

In some embodiments, a hinged lid with a valved exhaust vent affixed to a top of the upper smoker body is also provided.

The invention of the present disclosure, in another aspect thereof, comprises a smoker having an upper body and a lower body telescopically received by the upper body and having an air inlet in a floor thereof. A ledge is defined at a joint of the upper and lower body when the lower body is extended from the upper body. The smoker includes an interior component suspended from the ledge inside the smoker without fasteners. A removable fuel and ash assembly comprises a vertical circumferential wall in contact with the floor surrounding the air inlet and suspending a fuel grate and an ash pan above the air inlet, the ash pan configured to receive ashes falling through the fuel grate but to allow fluid flow from the air inlet to the fuel grate via a plurality of peripheral air ports defined through the ash pan above a floor of the ash pan. The smoker includes a snorkel providing air to the air intake and having an adjustable valve for controlling air flow that is located at least at an elevation of the ledge.

DETAILED DESCRIPTION OF THE PREFERRED EMBODIMENTS

Figure 1:
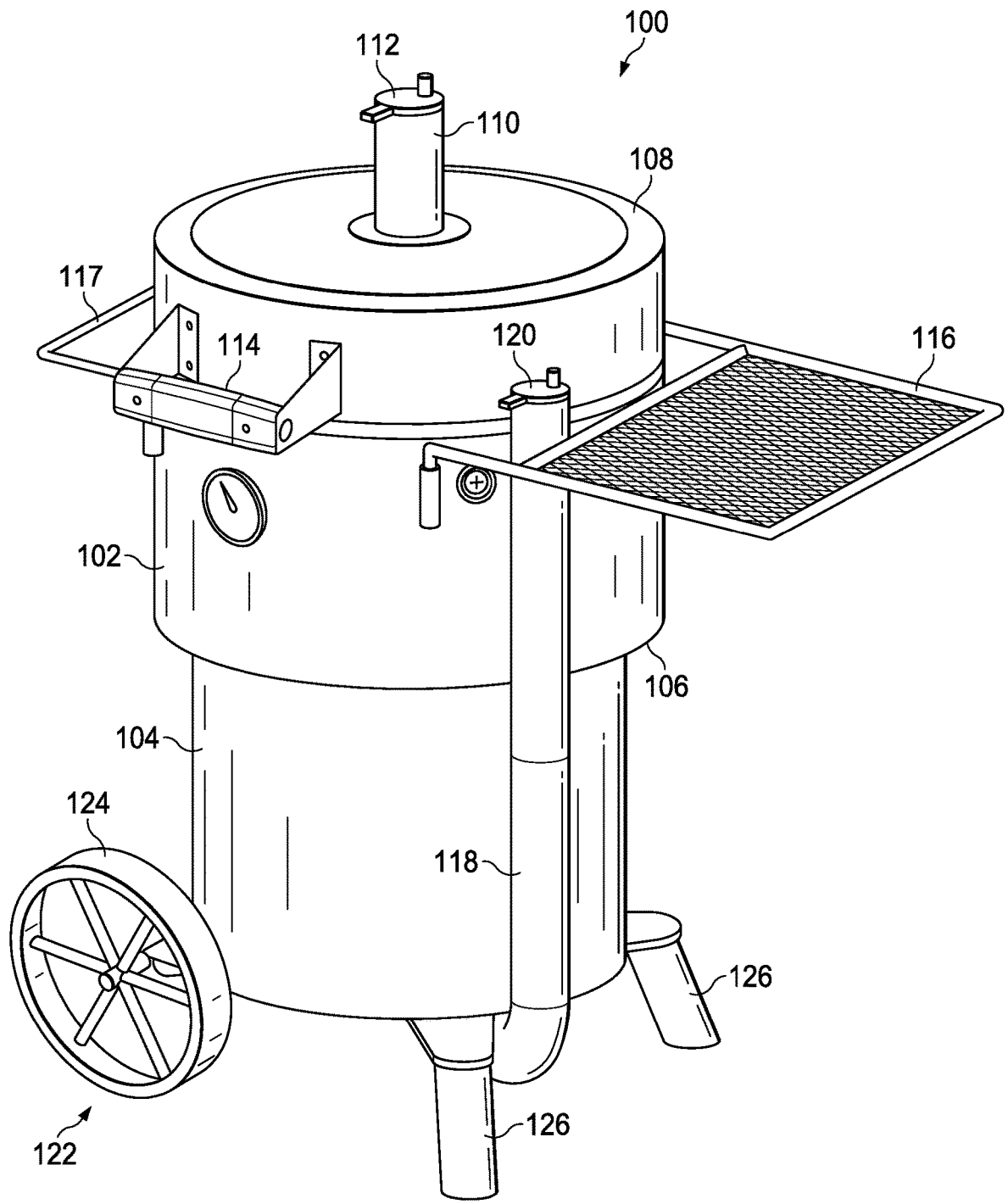
FIG. 1 is a perspective view of a barrel smoker according to aspects of the present disclosure.

Referring now to FIG. 1, a perspective view of a barrel smoker 100 according to aspects of the present disclosure is shown. The barrel smoker 100 may comprise an upper portion 102 affixed to a lower portion 104 with a ledge 106 formed at the joint. The upper portion 102 and the lower portion 104 may be formed from generally cylindrical, barrel-like members. The upper portion 102 thus forms an upper smoker body while the lower portion 104 forms a lower smoker body. The upper portion 102 and the lower portion 104 may be comprised of steel or another suitably resilient material.

The ledge 106 may appear outside the smoker 100 as an inward step in the cylindrical outline of the smoker 100. As discussed in more detail below, inside the smoker 100, the ledge 106 is utilitarian in providing a mounting or resting locations for various internal components.

The upper portion 102 may provide a hinged lid 108. An exhaust 110 may be provided with a closable valve 112. A handle 114 may also be provided on the lid 108. A side shelf 116 may be affixed to the upper portion 102, as well as an opposite side handle 117. The side shelf 116 may be a wire shelf or wooden platform or may be made of other materials.

The lower portion 104 may provide a snorkel 118 with a closable valve 120 that is situated proximate the lid 108. In this manner both valves 112, 120 can be easily accessed by a user (e.g., near waist level). The lower portion 104 may affix to a wheeled cart. The cart 122 may include a pair of wheels 124 and a pair of opposite legs 126. The cart 122 may serve to stabilize the smoker 100 as well as provide ease of movement. The cart 122 also provides clearance for the snorkel 118 to reach the bottom of the lower portion and the air inlet 202 (FIG. 2).

Figure 2:
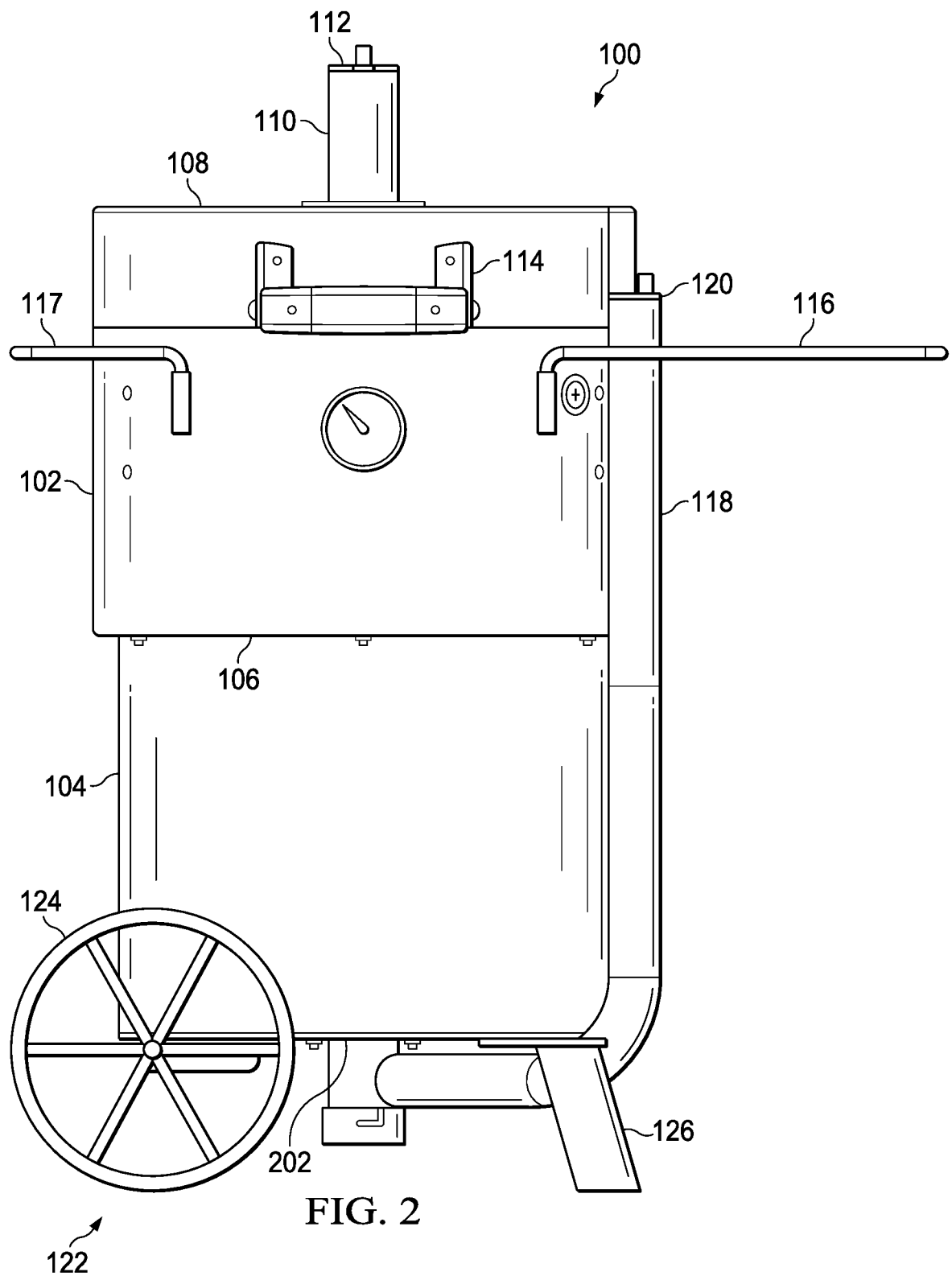
FIG. 2 is a side view of the barrel smoker of FIG. 1.

Referring now to FIG. 2 a side view of the barrel smoker 100 of FIG. 1 is shown. From FIG. 2 the arrangement between the upper portion 102 sitting atop the lower portion 104 and forming the ledge 106 can be seen. The lower portion 104 can also be seen adjoined to the snorkel 118 at an inlet 202. The inlet 202 may be on a lower portion or bottom side of the lower portion 104 and may be centrally located.

Figure 3:
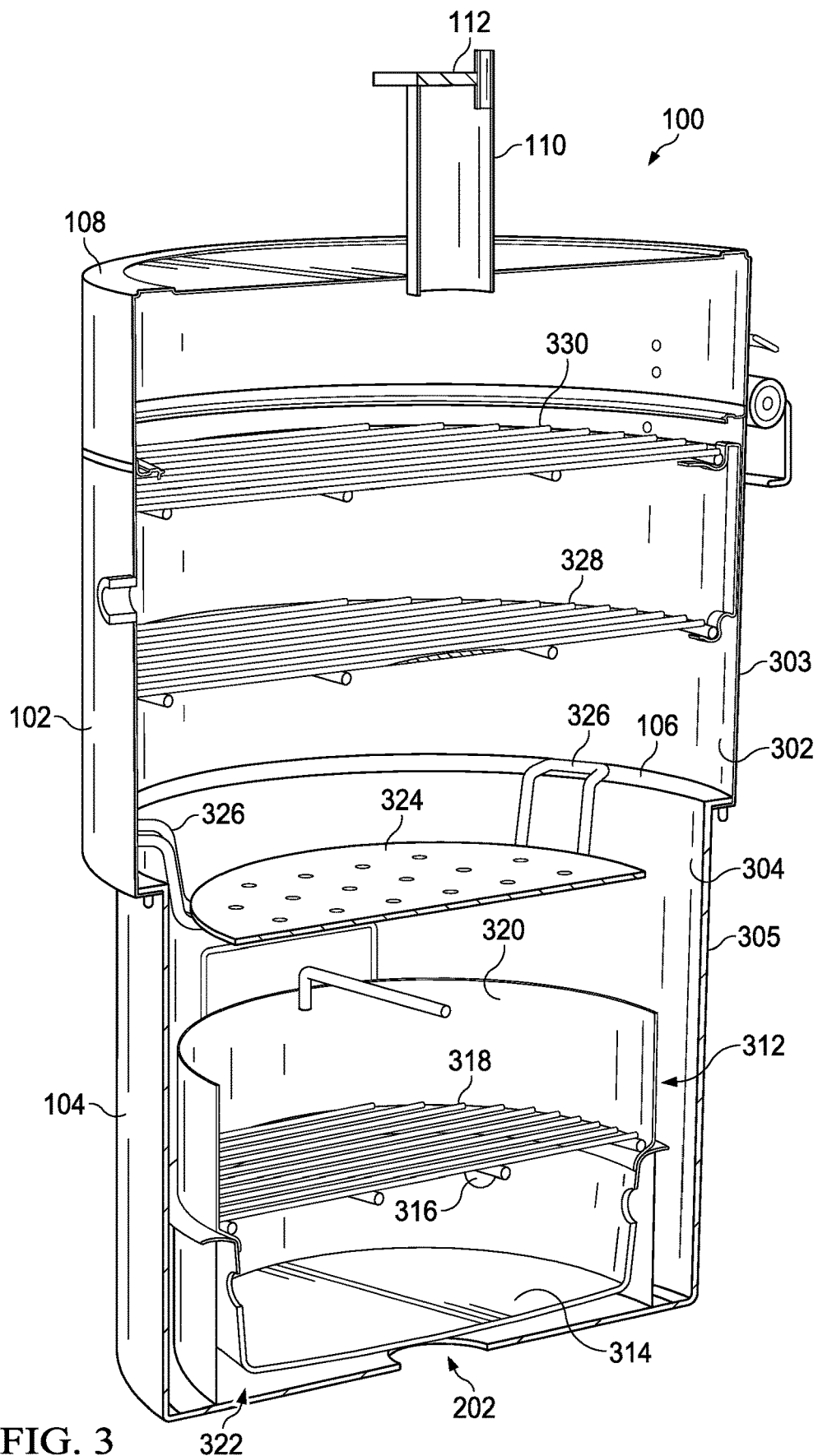
FIG. 3 is a perspective cutaway view of the barrel smoker of FIG. 1.
Figure 4:
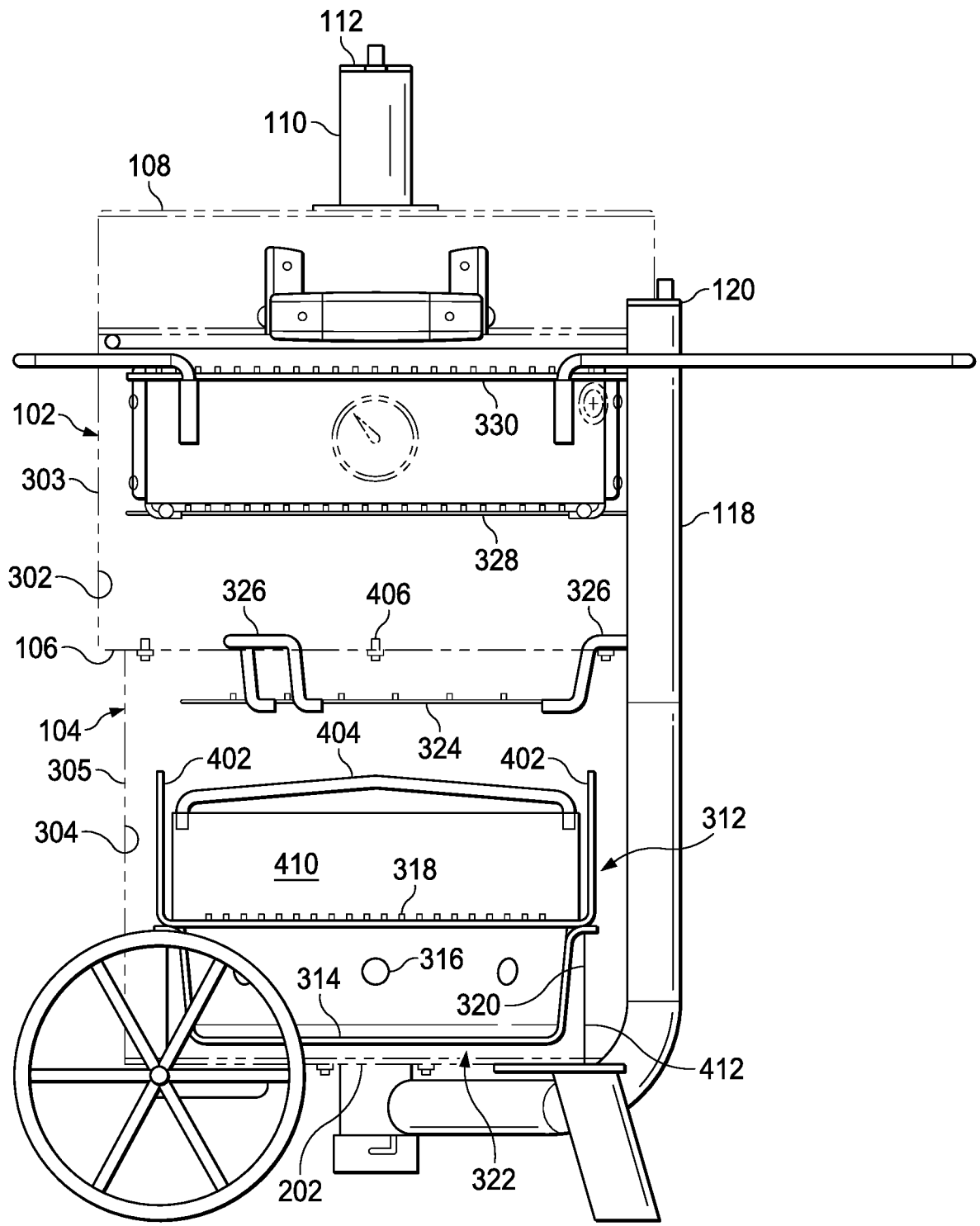
FIG. 4 is a side transparent view of the barrel smoker of FIG. 1.

Referring now also to FIG. 3 a perspective cutaway view of the barrel smoker 100 of FIG. 1 is shown. FIG. 4 is a side transparent view of the barrel smoker 100. FIGS. 3 and 4 better illustrate internal componentry of the barrel smoker 100 as described herein.

The upper portion 102 may be considered as comprising an inner surface 302 and outer surface 303 (though inner and outer surfaces 302, 304 may be opposite sides of the same component wall). Similarly, the lower portion 104 may comprise inner surface 304 and outer surface 305. As described above, both the upper portion 102 and lower portion 104 may be generally cylindrical and barrel-like implements. For purposes of the present disclosure, "generally cylindrical" means sufficiently cylindrical such that the upper portion 102 may fit telescopically and at least partially rotatably within the lower portion 104.

In the present embodiment, the upper portion 102 provides a larger diameter than the lower portion 104. The difference between the diameters may be occupied, at least in part, by the ledge 106. The ledge 106 may be formed by a flange proceeding from the inner surface 304 of the lower portion 104. In another embodiment the ledge 106 is formed by an inward projection of the inner surface 302 of the upper portion 102.

Figure 6:
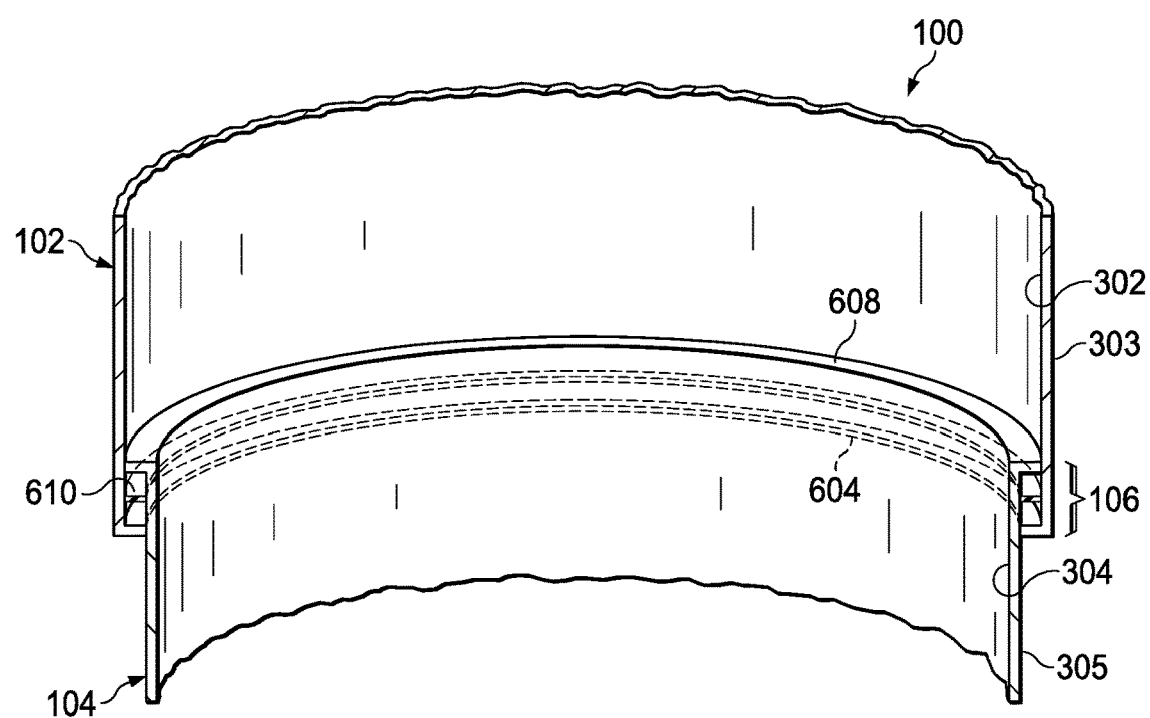
FIG. 6 is a side cutaway and partially transparent view of a barrel smoker according to aspects of the present disclosure.

As best seen in FIG. 6, in some embodiments, the lower portion 104 provides an outward projection 604 while the upper portion 102 provides an inward projection 608. The projections 604, 608 may join together to form the ledge 106. The projections 604, 608 may be solid (e.g., unbroken or uninterrupted) toroidal members, and may be formed from the same material comprising the upper portion 102 and lower portion 104, respectively. In some embodiments, portions of inward projection 604 and/or lower projection 608 may be cutout or petal-shaped (not shown) such as would be formed by cutting and bending the upper portion 102 and/or the lower portion 104, respectively. In some embodiments an additional element 610 may interpose the inward projection 604 and the outward projection 608. The element 610 may be toroidal in shape and may be a single piece or comprise multiple pieces. In some embodiments, the element 610 is a gasket or seal comprising rubber, plastic, silicon or the like. In some embodiments it may comprise metallic components as well.

Figure 5:
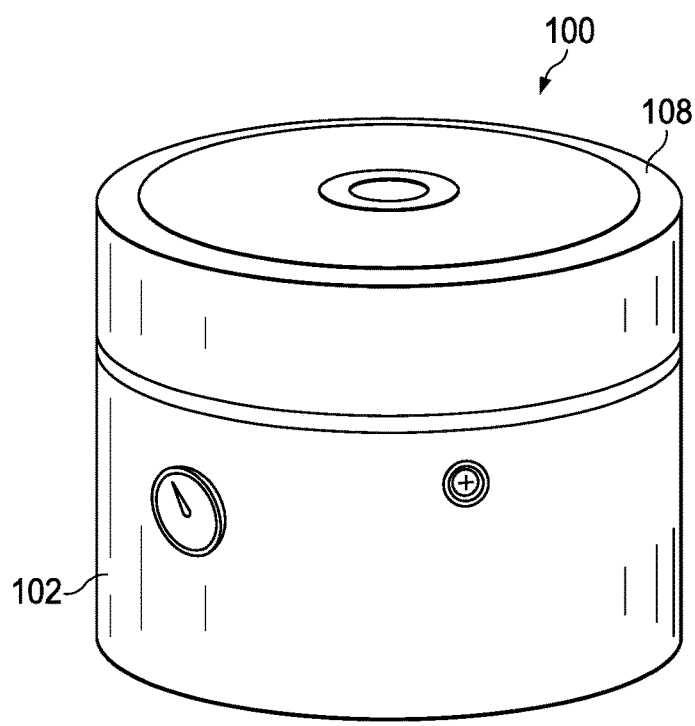
FIG. 5 is a perspective view of a barrel smoker collapsed for shipping according to aspects or the present disclosure.

As shown in FIG. 4, fasteners 406 may be provided for joining the upper portion 102 to the lower portion 104 when assembled in an operational manner. The fasteners may comprise nuts, bolts, clamps, or other implements that may be utilized during assembly to permanently or removably affixed the upper portion 102 to the lower portion 104. However, during shipping or transport, the upper portion 102 may not be attached to the lower portion 104 via the inward projection 604 and the outward projection 608. Thus the lower portion 104 may be partially or completely fitted or telescopically received within the upper portion 102 (or vice versa) thus reducing the total height and volume required for shipping the disassembled barrel smoker 100. FIG. 5 illustrates one embodiment of the smoker 100 in a shipping or packaging configuration with the lower portion 104 contained within the upper portion 102. Exterior pieces (e.g., cart 122, snorkel 118) may be removed and placed elsewhere within the same package or placed inside the smoker 100.

Referring again to an assembled configuration (e.g., FIGS. 3-4) a fuel and ash assembly 312 may fit within the lower portion 104 of the smoker 100. The fuel and ash assembly 312 may comprise an ash pan 314 providing one or more peripheral openings or air ports 316 for admitting combustion air. The ash pan 314 is solid or impermeable to ash and or fluid flow apart from the ports 316. Thus the ash pan 314 will retain ash or other solids that fall onto or into it from above but still allow airflow via the ports 316. In some embodiments, air or fluid flow upward through inlet 202 and into the smoker 100 only occurs through the fuel and ash assembly and, in particular, the ports 316.

A fuel grate 318 may be situated above or superior to the ash pan 314. The fuel grate 318 and the ash pan 314 may affix (directly or indirectly) to a circumferential wall 320 which serves to properly orient and locate the components of the fuel and ash assembly 312. The ash pan 314 may be utilized to contain ashes from spent fuel falling through the fuel grate 318. However, the fuel grate 318 may contain smoking materials such as wood chips in addition to or instead of fuel. In such case, the fuel may occupy the fuel grate 318 or may be ignited and combusted within the ash pan 314.

In order to more precisely control air flow, the ash pan 314 may be elevated with respect to floor of the lower portion 104, thus creating a void 322. In operation intake air may be provided the snorkel 118 controlled by the valve 120 and enter into the intake 202. Air entering the intake 202 may be forced to move toward the sides of the fuel and ash assembly 312 in order to be drawn into the circumferential openings 316 of the ash pan 314. This air may supply oxygen for the combustion and smoke production processes taking place in the ash pan 314 and/or on the fuel grate 318.

As best seen in FIG. 4, the fuel and ash assembly 312 may provide one or more handles 402 for lifting the fuel and ash assembly 312 in and out of the smoker barrel 100 or the lower portion 104 of the smoker barrel 100. Also shown is a cross member support 404, which may also serve as a handle.

In the present embodiment, a diffuser 324 is suspended from the ledge 106. The diffuser 324 is a perforated panel which is also provided with a plurality of suspension brackets 326. The suspension brackets 326 rests upon the ledge 106 in order to suspend the diffuser 324 at a desired location with respect to the fuel grate 318 or the fuel and ash assembly 312. The brackets 326 may not require tools or fasteners to install. It will be appreciated that by varying a length of the brackets 326 the diffuser 324 may be suspended higher or lower within the smoker 100.

It will also be appreciated that the ledge 106 is not limited in utility to suspending or locating the diffuser 324. Various interior components may be mounted to, or suspended from, the ledge 106. These include, without limitation, food support platforms, food support grates, diffuser grates, fuel and ash assemblies, and/or other components. Multiple components may be suspended from a single ledge by utilizing brackets of different lengths. It should also be appreciated that two portions or barrel-components are illustrated here, but three or more could be used to even further reduce packing size and/or provide additional ledges within the structure.

In the present embodiment the upper portion 102 of the smoker barrel 100 provides a lower food support grate 328 and an upper food support grate 330. As shown, the lower food support grate 328 is near a medial portion of the inner surface 302 of the upper portion 102. The upper food support grate 330 is shown near a top of the upper portion 104, near the lid 108. However, it should be understood that the food support grates 328, 330 are for illustration only and that the locations may vary, in addition to having more or fewer food support grates.

It should also be understood that, in some embodiments, the ledge 106 minimizes or eliminates the need for other internal brackets or fixtures for location internal components. However, having the ledge 106 does not preclude additional brackets, fixtures, or other mounting mechanisms inside or elsewhere on the smoker 100 in every embodiment. It should be understood that the upper portion 102 and lower portion 104 of varying diameters provides benefits both enumerated and otherwise. The include, without limitation, collapsibility for reducing packaging size and creation of the ledge 106. Benefits of the ledge 106, without limitation, include use as a mounting or resting point for internal componentry as described.

It is to be understood that the terms "including", "comprising", "consisting" and grammatical variants thereof do not preclude the addition of one or more components, features, steps, or integers or groups thereof and that the terms are to be construed as specifying components, features, steps or integers.

The term "selectively" is taken to mean that the selective feature or operation is fully capable of being performed by the object (or by a user of such object) such that the object is constrained in reference thereto and such features or operational capability are not optional unless so described. However, a selective feature or operation is not necessarily in effect all the time, but may be selected to be so by operation of a user or other described force.

If the specification or claims refer to "an additional" element, that does not preclude there being more than one of the additional elements.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A smoker comprising:
   first wall forming a generally cylindrical segment of a first diameter and having an inward projection into the cylindrical segment of the first diameter; and
   second wall forming a generally cylindrical segment of a second diameter, and having an outward projection away from the cylindrical segment of the second diameter;
   an ash and fuel assembly within the at least one generally cylindrical segment of a second diameter;
   wherein the first diameter is greater than the second diameter; and
   wherein the inward projection and outer projection together form a ledge.

2. The smoker of claim 1, further comprising at least one interior component suspended from the ledge.

3. The smoker of any claim 1, further comprising an air inlet into the at least one generally cylindrical segment of a second diameter on a lower portion thereof, the air inlet fed by a snorkel extending upwardly at least to a level of the at least one generally cylindrical segment of a first diameter.

4. The smoker of claim 1, further comprising an ash pan with circumferentially located air ports suspended above a floor of the at least one generally cylindrical segment of a second diameter so as to form a void between the ash pan and the floor.

5. The smoker of claim 1, wherein a diffuser plate is suspended from the ledge by brackets that do not fasten to the ledge.

6. The smoker of claim 1, further comprising a wheeled cart affixed to one of the at least one generally cylindrical segment of a first diameter and at least one generally cylindrical segment of a second diameter.

7. The smoker of claim 1, wherein the at least one generally cylindrical segment of a first diameter provides a hinged lid with an exhaust.

8. The smoker of claim 7, further comprising at least one valve-controlled input feeding into the at least one generally cylindrical segment of a second diameter.

9. The smoker of claim 8, further comprising at least one valve-controlled exhaust feeding from the at least one generally cylindrical segment of a first diameter.

10. A smoker comprising:
    an upper smoker body having an inner cylindrical wall with an inward projection proximate a bottom thereof; and
    a lower smoker body having an outer cylindrical wall with an outward projection proximate a top thereof;
    wherein the inward projection forms a smaller diameter than a diameter of the inner cylindrical wall;
    wherein the outward projection forms a larger diameter than a diameter of the outer cylindrical wall; and
    wherein the lower smoke body telescopically projects from the upper smoker body such that the inward projection and outward projections join to form a ledge inside the smoker.

11. The smoker of claim 10 further comprising a plurality of fasteners that selectively rigidly attach the inward projection in a fixed relationship to the outward projection.

12. The smoker of claim 11, further comprising a diffuser suspended from the ledge by a plurality of brackets.

13. The smoker of claim 11, further comprising further an ash pan having circumferentially located air ports suspended above a floor of the lower smoker body.

14. The smoker of claim 13, further comprising further an air inlet into the floor of the lower smoker body, the air inlet fed by a snorkel extending upwardly at least to a level of the upper smoker body.

15. The smoker of claim 14, further comprising a fuel grate above the ash pan.

16. The smoker of claim 15, further comprising a circumferential wall in contact with the floor suspending the ash pan above the air inlet and suspending the fuel grate above the ash pan such that air entering the inlet can only reach the fuel grate via the air ports in the ash pan.

17. The smoker of claim 16, further comprising an air valve on the snorkel distal from the air inlet.

18. The smoker of claim 17, further comprising a hinged lid with a valved exhaust vent affixed to a top of the upper smoker body.

19. A smoker comprising:
    an upper body;
    a lower body telescopically received by the upper body and having an air inlet in a floor therof;
    a ledge defined at a joint of the upper and lower body when the lower body is extended from the upper body;
    an interior component suspended from the ledge inside the smoker without fasteners;
    a removable fuel and ash assembly comprising a vertical circumferential wall in contact with the floor surrounding the air inlet and suspending a fuel grate and an ash pan above the air inlet, the ash pan configured to receive ashes falling through the fuel grate but to allow fluid flow from the air inlet to the fuel grate via a plurality of peripheral air ports defined through the ash pan above a floor of the ash pan; and a snorkel providing air to the air intake and having an adjustable valve for controlling air flow that is located at least at an elevation of the ledge;

wherein the joint comprises an inward projection from the upper body and an outward projection from the lower body such that the joint defines an inward step into a cylinder formed by the upper body.

\* \* \* \* \*